(12) United States Patent
Savicki

(10) Patent No.: US 8,387,568 B2
(45) Date of Patent: Mar. 5, 2013

(54) LITTER BOX LINER

(75) Inventor: Alan F. Savicki, Yorkville, IL (US)

(73) Assignee: The Clorox Company, Oakland, CA (US)

( * ) Notice: Subject to any disclaimer, the term of this patent is extended or adjusted under 35 U.S.C. 154(b) by 141 days.

(21) Appl. No.: 12/465,601

(22) Filed: May 13, 2009

(65) Prior Publication Data

US 2010/0288202 A1 Nov. 18, 2010

(51) Int. Cl.
*A01K 1/035* (2006.01)

(52) U.S. Cl. ........................... 119/170; 119/167

(58) Field of Classification Search ............ 119/165, 119/167, 170; 383/8, 77, 120, 122, 123, 383/124; 229/117.05, 117.06
See application file for complete search history.

(56) References Cited

U.S. PATENT DOCUMENTS

| | | | | | |
|---|---|---|---|---|---|
| 1,411,510 | A | * | 4/1922 | Peterson | 383/116 |
| 1,486,043 | A | * | 3/1924 | Schwartz | 383/122 |
| 3,227,137 | A | * | 1/1966 | Goldman et al. | 119/170 |
| 3,377,990 | A | * | 4/1968 | Mitcheil | 119/165 |
| 4,279,217 | A | * | 7/1981 | Behringer | 119/170 |
| 4,524,459 | A | * | 6/1985 | Titchenal | 383/37 |
| 4,558,801 | A | | 12/1985 | Vilutis | |
| 4,615,300 | A | * | 10/1986 | McDonough | 119/167 |
| 4,779,566 | A | | 10/1988 | Morris et al. | |
| 4,779,567 | A | | 10/1988 | Smith | |
| 4,779,998 | A | | 10/1988 | Wischusen, III | |
| 4,807,563 | A | | 2/1989 | Berry et al. | |
| 4,872,420 | A | | 10/1989 | Shepard | |
| 5,038,721 | A | | 8/1991 | Ouellette et al. | |
| 5,115,766 | A | | 5/1992 | Williams | |
| 5,121,712 | A | * | 6/1992 | Schulein et al. | 119/167 |
| 5,123,381 | A | * | 6/1992 | Salmon | 119/165 |
| 5,134,974 | A | * | 8/1992 | Houser | 119/168 |
| 5,249,550 | A | * | 10/1993 | Hines et al. | 119/168 |
| 5,359,960 | A | * | 11/1994 | Yananton | 119/165 |
| 5,488,930 | A | * | 2/1996 | Kasbo et al. | 119/170 |
| 5,492,240 | A | | 2/1996 | Vilutis | |
| 5,517,947 | A | * | 5/1996 | Christman | 119/166 |
| 5,551,376 | A | * | 9/1996 | Lundeen et al. | 119/167 |
| 5,758,601 | A | * | 6/1998 | Dickson | 119/170 |
| 5,850,798 | A | * | 12/1998 | Engel | 119/170 |
| 5,983,832 | A | * | 11/1999 | Seo | 119/170 |
| 6,220,753 | B1 | | 4/2001 | Metzger | |
| 6,408,790 | B1 | * | 6/2002 | Maguire | 119/166 |
| 6,453,845 | B1 | * | 9/2002 | Efrati et al. | 119/168 |
| 6,595,159 | B1 | * | 7/2003 | Montalbano | 119/167 |
| 6,623,162 | B2 | | 9/2003 | Pang | |
| 6,668,755 | B1 | * | 12/2003 | Koster | 119/167 |
| 6,966,697 | B2 | | 11/2005 | Patridge et al. | |
| 7,344,309 | B2 | | 3/2008 | Patridge et al. | |

(Continued)

FOREIGN PATENT DOCUMENTS

WO WO2008134827 A1 11/2008

*Primary Examiner* — Rob Swiatek
*Assistant Examiner* — Lisa Tsang
(74) *Attorney, Agent, or Firm* — Ann Lee

(57) ABSTRACT

Described is a litter box liner having handle ties and a form-fitted bottom. The bottom may be square or rectangular-shaped and may be sized to fit into a particular size litter box. The bottom may include the feature that there are no foldovers contained therewithin. At least a bottom portion of the litter box liner may be reinforced to resist tears. Such a reinforcement layer may include a woven polypropylene fabric layer or an extruded polypropylene film. The litter box liner may be, at least in part, formed of high density polyethylene (HDPE), thereby providing an additional means for tear resistance in the litter box liner.

4 Claims, 4 Drawing Sheets

U.S. PATENT DOCUMENTS

| | | |
|---|---|---|
| 2001/0004079 A1 | 6/2001 | Metzger |
| 2002/0002954 A1* | 1/2002 | Goitiandia .................... 119/165 |
| 2004/0164132 A1* | 8/2004 | Kuester .................... 229/117.06 |
| 2004/0200890 A1* | 10/2004 | Mesly .......................... 229/101 |
| 2005/0157961 A1* | 7/2005 | Langston ...................... 383/103 |
| 2006/0120635 A1* | 6/2006 | Su ................................ 383/126 |
| 2007/0292053 A1* | 12/2007 | Lin et al. ......................... 383/78 |
| 2008/0067222 A1* | 3/2008 | Kleiner .................... 229/117.06 |

* cited by examiner

LITTER BOX LINER

BACKGROUND OF THE INVENTION

1. Field of the Invention

This invention relates generally to a litter box liner and more specifically to a litter box liner that fits snugly to a cat litter box and that resists tears from the animal's claws.

2. Description of the Related Art

Liners have been used in litter boxes for many years. They often take the form of a bag having an open mouth. When installed on the litter box, one panel of the bag is placed in the litter box cavity and is flexible enough to conform generally to the shape of the cavity. Litter, such as cat litter, can then be placed in the cavity with the liner generally preventing contact with the litter box. In order to provide a universal fit, such liners tend to be oversized or stretchable so that they can accommodate both large and small litter boxes. This can lead to problems. If there is sufficient excess material in the liner, for example, the liner can move or shift during use of the litter box by an animal, such as a cat, which can lead to litter going into the litter box itself. A stretchable liner may, for example, provide weakened stretch areas, where an animal's claw may more readily puncture the liner.

Typical litter box liners are well-known in the art. For example, U.S. Pat. Nos. 3,227,137, issued to Goldman; 5,006,379, issued to Paciullo; 4,872,420 issued to Shepard; 5,983,832 issued to Seo; 5,038,721 issued to Ouellette; 6,453,845 issued to Efrati; and 5,115,766 issued to Williams each describe various types of litter box liners.

More specifically, Williams describes a litter box liner that may include a folded bottom. Litter box liners with folded bottoms may present problems where litter or animal waste may get trapped in the folds. Other litter box liners, like that of Efrati, may include straight side walls, that is, side walls that may be perpendicular to the bottom. Many typical litter boxes may be designed with tapered walls and, therefore, box liners with straight side walls may have trouble properly fitting into these typical litter boxes.

Accordingly, what is needed is a simple, easy-to-use and cost effective litter box liner that provides durability, a simple and reliable closure, and a shape that is complementary to the function of the litter box.

SUMMARY OF THE INVENTION

In accordance with the principles of the present invention, in one embodiment, a litter box liner comprises a bottom portion fitting into a bottom of a litter box; side portions, attached to and extending from the bottom portion, wherein the bottom portion lacks any foldovers when the litter box liner is installed in the litter box; and the side portions having a shape corresponding to the shape of the side walls of the litter box when the litter box liner is installed in the litter box.

According to another embodiment of the present invention, a litter box liner comprises a bottom portion fitting into a bottom of a litter box; side portions, attached to and extending from the bottom portion; at least two handle ties integrally formed with the side portions; and a reinforced layer, the reinforced layer included in the bottom portion and at least a portion of the side portions of the litter box liner, wherein the bottom portion lacks any foldovers when the litter box liner is installed in the litter box.

In another embodiment of the invention, a litter box liner comprises a bottom portion fitting into a bottom of a litter box; side portions, attached to and extending from the bottom portion; and at least two handle ties integrally formed with the side portions; wherein the bottom portion is formed from high density polyethylene and lacks any foldovers when the litter box liner is installed in the litter box.

Further features and advantages of the present invention will become apparent to those of ordinary skill in the art in view of the detailed description of embodiments below, when considered together with the attached drawings and claims.

BRIEF DESCRIPTION OF THE DRAWINGS

The foregoing aspects and others will be readily appreciated by the skilled artisan from the following description of illustrative embodiments when read in conjunction with the accompanying drawings, in which.

DETAILED DESCRIPTION

Figure 1:
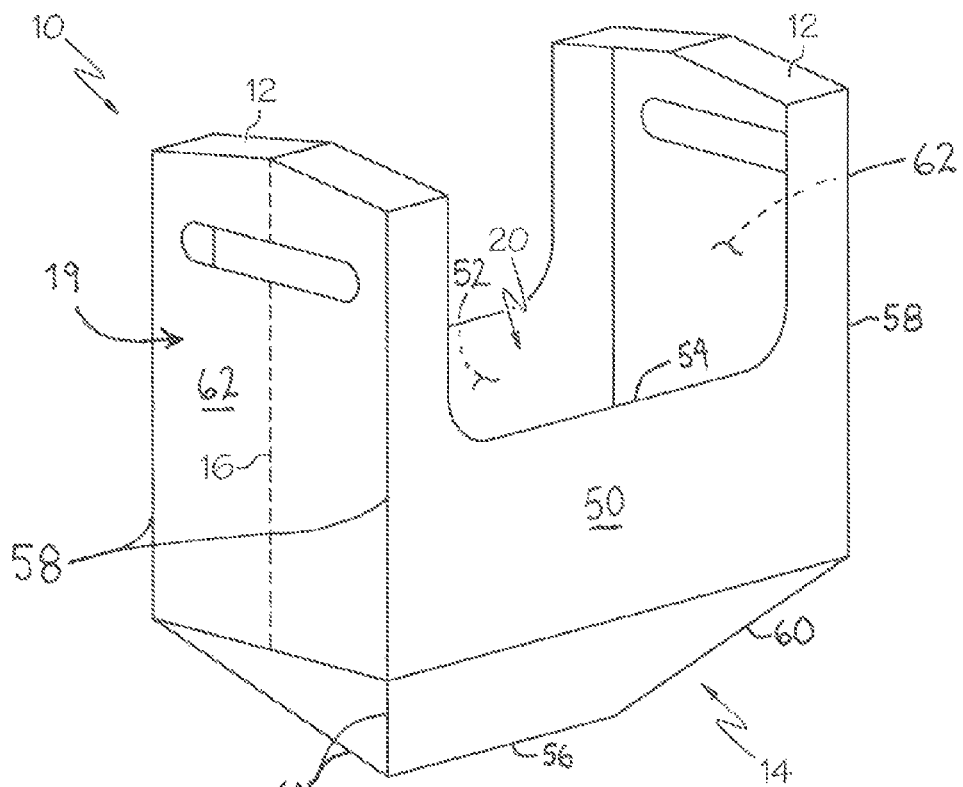
FIG. 1 shows a perspective view of a litter box liner according to an exemplary embodiment of the present invention.

Reference will now be made to the drawings wherein like numerals refer to like parts throughout. Exemplary embodiments of the present invention are illustrated in the context of a litter box liner that has a square or rectangular bottom, without foldovers, and that is form fitted to fit inside a litter box. The skilled artisan will readily appreciate, however, that the materials and methods disclosed herein will have application in a number of other contexts where a litter box liner may be advantageous.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "surfactant" includes two or more such surfactants.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As used herein, the term "litter box" used as a standalone phrase, or when used in reference to a "litter box liner", refers to a container into which litter may be placed and into which an animal eliminate or excrete biological wastes. Typically, a litter box may be used for a domestic cat, however, a litter box for any animal may take advantage of the features of the litter box liner according to various embodiments of the present invention.

Broadly, embodiments of the present invention relate to a litter box liner that may have a form-fitted bottom. The bottom may be square or rectangular-shaped and may be sized to fit into a particular size litter box, such as a typical large or jumbo-sized litter box. The bottom may include the feature that there are no foldovers contained therewithin. In other words, when the bottom is placed into an appropriately sized litter box, the bottom would lie flat, without a fold therein. Such a design may be advantageous as a bottom portion with foldovers may create spaces for liquids to collect or for dirty litter to collect. According to one embodiment of the present invention, at least a bottom portion of the litter box liner may be reinforced to resist tears. Such a reinforcement layer may include, for example, a woven polypropylene fabric layer or an extruded polypropylene film. According to another embodiment of the present invention, the litter box liner may be, at least in part, formed of high density polyethylene (HDPE), thereby providing a further means of tear resistance in the litter box liner. According to a further embodiment of the present invention, the sides of the litter box liner may be tapered from the bottom surface of the litter box liner, wherein the top edges of the side walls form a larger area footprint as compared to the bottom edges of the side walls.

Referring to FIG. 1, there is shown a perspective view of a litter box liner 10 having handle ties 12 a bottom 14 according to one embodiment of the present invention. The litter box liner 10 may be formed having side gussets 16, as shown by the dotted lines in FIG. 1, or having a bottom gusset 18, as shown with reference to FIGS. 4A through 4D, below. The litter box liner 10 may have an open top 20 through which litter may be added or removed from a litter box (not shown). The litter box liner may be formed of any suitable material. Typically, the litter box liner may be formed of a polymeric material that may be impermeable to fluids and resistant to tearing. A further description of possible materials for the litter box liners according to various embodiments of the present invention is provided below.

Figure 2:
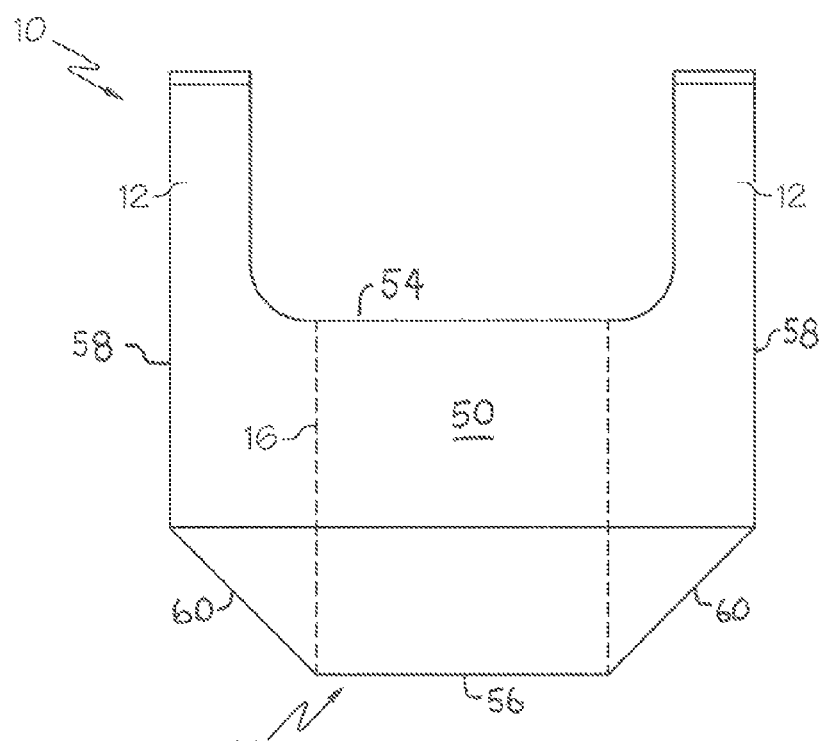
FIG. 2 shows a right front side view of the litter box liner of FIG. 1, in a folded configuration, the left rear side view being a mirror image thereof, according to an embodiment of the present invention.

Referring to FIG. 2, there is shown a side view of the litter box liner 10 of FIG. 1, in a flattened configuration. In one embodiment of the present invention, the gussets 16 may allow the litter box liner 10 to fold flat, thereby permitting the litter box liner 10 to be stored in a relatively small space and allowing for convenient packaging for the litter box liner 10.

Figure 3:
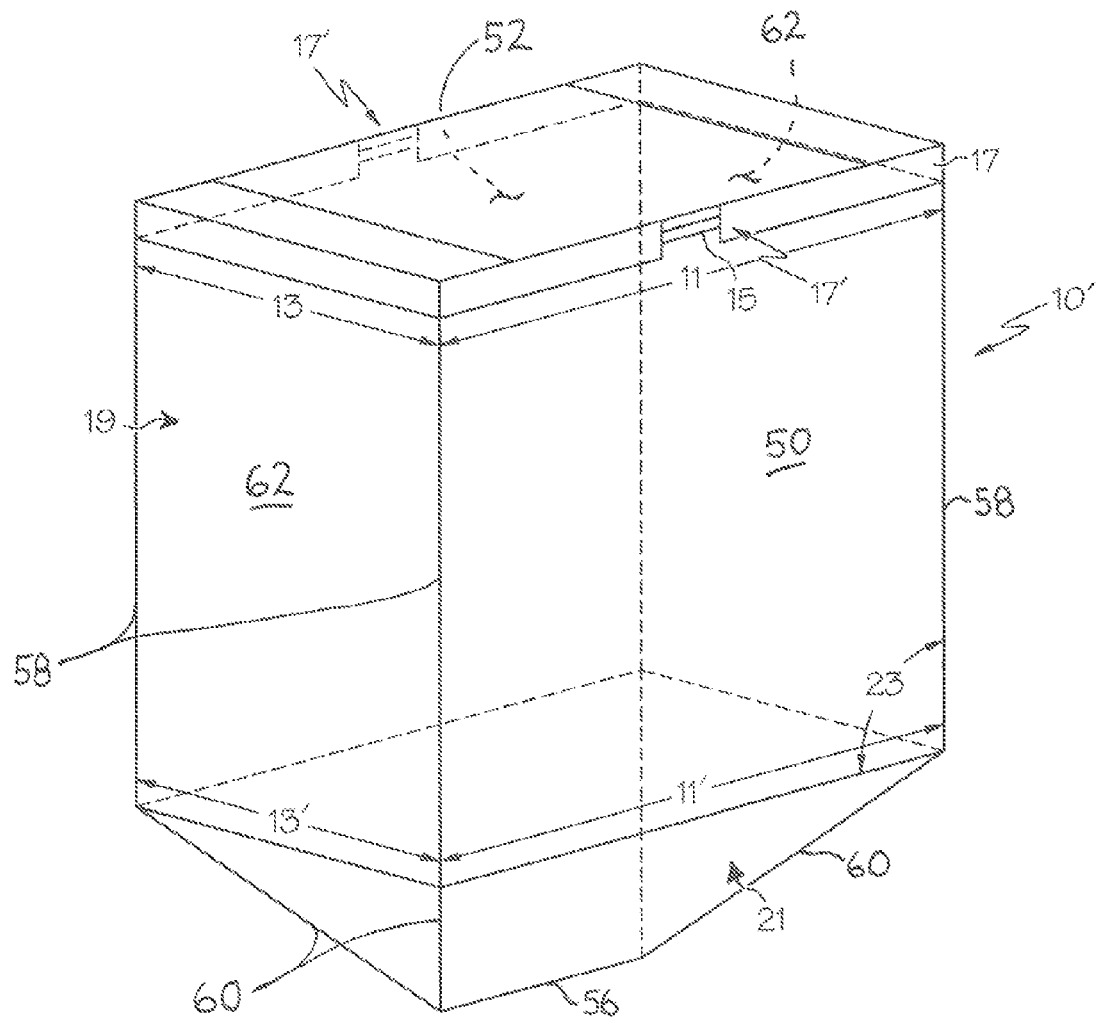
FIG. 3 shows a perspective view of a litter box liner of FIG. 1 having a drawstring enclosure, according to an embodiment of the present invention.

Referring to FIG. 3, there is shown a perspective view of a litter box liner 10', wherein the handle ties 12 may be replaced with a drawstring 15. The drawstring 15 may be enclosed in a drawstring enclosure 17 which may be formed by folding down a top portion of the side walls 19. The drawstring enclosure 17 may have at least two cut away portions 17' wherein the drawing 15 may be visible to be grasped by a user and tied together to close the liner 10'.

According to another embodiment, as shown in FIG. 3, the side walls 19 may be formed at a taper from the bottom 21 of the litter box liner 10'. In one embodiment of the present invention, the side wall may be formed at an angle 23 from about 40 to about 55 degrees relative to the bottom 21 of the liner 10'. Typically, this angle 23 may be from about 45 to about 51 degrees and, in one embodiment of the present invention, from about 49 to about 51 degrees. The result of this taper is that the footprint formed by the top of the sides 19 may be larger than the footprint formed by the bottom of the sides 19 (which may be the same as the footprint of the bottom 21 of the liner 10'). In other words, a length 11 and width 13 of the top of the sides 19 may be larger than a length 11' and width 13' of the bottom of the sides 19. While this taper embodiment is specifically described in relation to the drawstring embodiment of FIG. 3, the taper described above may be applicable to any of the various embodiments herein described.

Referring now to the embodiments of FIGS. 1-3, the litter box liner 10, 10' may be convertible from a first folded, lay flat configuration to a second, unfolded use configuration. The liner 10, 10' in the folded lay flat configuration may include a first face panel 50 and a second face panel 52. Each face panel has opposing side edges 58, a top edge 54, and bottom edge 56. Each of the side edges 58 includes a first segment 58 extending vertically downward from the top edge 54 and a second segment 60 angled inwardly and downwardly and that connects the first segment 58 to the bottom edge 56. The side walls 19 of litter box liner 10 may include a side gusset 16 thus forming gusseted side panels 62 that connect the first face panel 50 to the second face panel 52 along the respective first and second segments 58, 60. The first face panel 50 and second face panel 52 may be joined together along common bottom edge 56. As best seen in FIG. 1 or FIG. 3, the liner 10, 10', when unfolded to the second use configuration, forms a four sided standup bag having upstanding walls defined by portions of the side panels 62 joined to the face panels 50, 52 along the first segments 58 and a flat bottom portion 14 defined by portions of the side panels 62 joined to the face panels 50, 52 along the second segments 60. As noted above with reference to FIG. 3, the liner 10, 10' when moved into its unfolded use configuration may have a maximum footprint defined by an open top perimeter (e.g., the perimeter at the top formed by the lengths 11 and widths 13) that is larger than a footprint of the liner 10, 10' at the bottom 21 (e.g., the bottom perimeter formed by lengths 11' and widths 13'). Also, as noted above the bottom portion in the unfolded use configuration contains no fold overs.

Figure 4A:
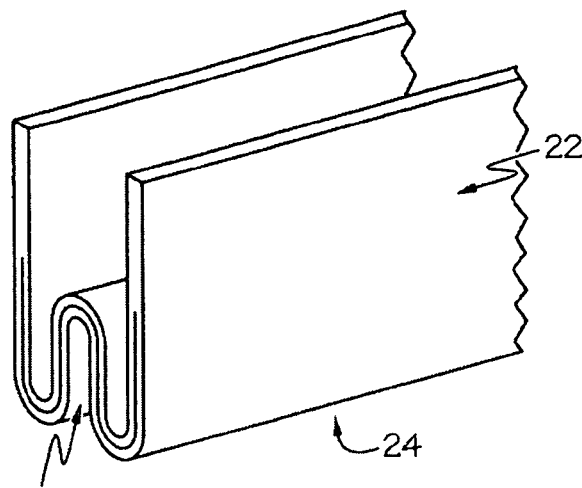
FIGS. 4A through 4D show steps in the manufacture of a litter box liner having a bottom gusset, according to an embodiment of the present invention.
Figure 4B:
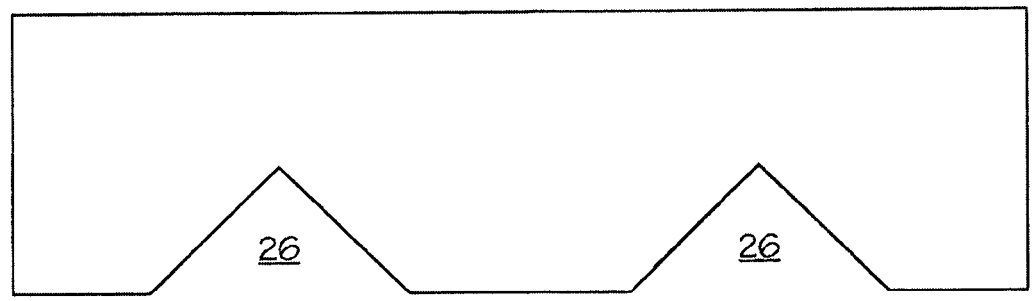
Figure 4C:
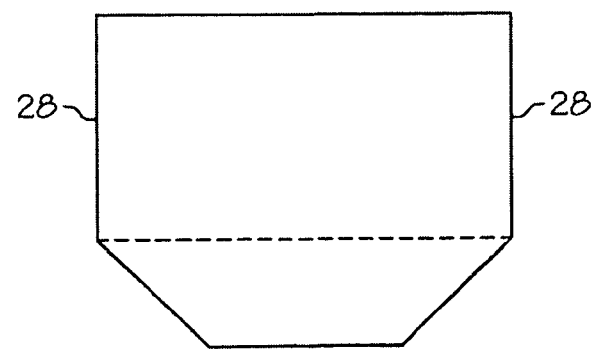
Figure 4D:
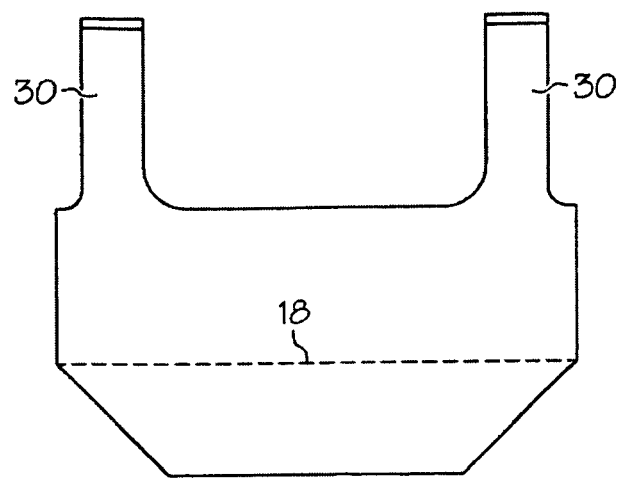

Referring now to FIGS. 4A through 4D, there are shown steps for the manufacture of a bottom gusset litter box liner 22, according to one embodiment of the present invention. The litter box liner 22 may begin as a U-shaped sheet with a bottom gusset 18 formed along a bottom portion 24 thereof, as shown in FIG. 4A. When the U-shaped sheet is laid flat, cut-outs 26 may be made as shown in FIG. 4B. These cut-outs 26, when the laid flat sheet is refolded into the U-shape of FIG. 4A, form the design as shown in FIG. 4C. At this step, the sides 28 may be sealed. The handles 30 may be cut out as shown in FIG. 4D. The result is a litter box liner, having handle ties, which may snugly fit into a litter box without overlapping folds.

Figure 5:
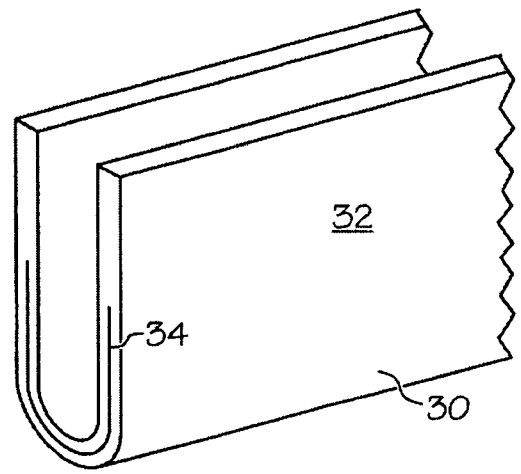
FIG. 5 shows a cross-sectional view of a litter box liner having a reinforced layer formed therein, according to an embodiment of the present invention.
Figure 6:
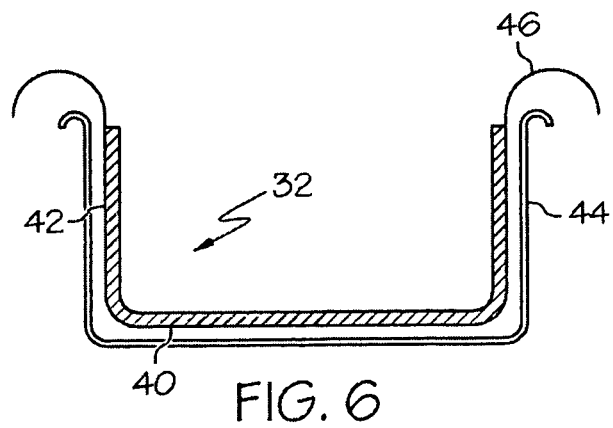
FIG. 6 shows the litter box liner of FIG. 5 installed in a litter box, according to an embodiment of the present invention.

Referring to FIG. 5, there is shown a cross-sectional view of a litter box liner 32 having a reinforced layer 34 formed therein, according to an embodiment of the present invention. The reinforced layer 34 may be, for example, a heat sealable polypropylene woven fabric. In another embodiment of the present invention, the reinforced layer 34 may be an extruded polypropylene film layer. The reinforced layer 34 may be sandwiched between layers of heat sealable polyethylene 36, as shown in FIG. 5. The reinforced layer 34 may be formed in a bottom portion 40 of the litter box liner 32, or in the bottom portion 40 and a side portion 42 of the litter box liner 32, as shown installed in a litter box 44 in FIG. 6. Handles 46 of the litter box liner 32 may extend over the litter box 44 as shown in FIG. 6. The side portions 42 may have a shape corresponding to the shape of the side walls of the litter box 44 when the litter box liner 32 is installed in the litter box 44.

As an alternative to the reinforced layer of FIGS. 5 and 6, the litter box liner, according to an embodiment of the present invention, may be formed from high density polyethylene (HDPE). Tear resistance may be provided by the HDPE. Typically, the litter box liner may be formed from HDPE that is from about 1.5 to about 5 mils thick, wherein, in an exemplary embodiment, the HDPE may be from about 2 to about 3 mils thick.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

I claim:

1. A litter box liner in the form of a bag made of flexible sheet material and being convertible from a first folded, lay flat configuration to a second, unfolded use configuration;
   a) the liner in the folded lay flat configuration including:
      i) first and second face panels, each face panel having opposing side edges, a top edge and a bottom edge;
      ii) each of the side edges having a first segment extending vertically downward from said top edge and a second segment angled inwardly and downwardly and connecting the first segment to the bottom edge; and
      iii) a pair of gussets connecting the first face panel to the second face panel along respective side edges;
      iv) the first and second face panels also being joined together along their respective bottom edges; and
   b) the liner when unfolded to the second use configuration and prior to insertion within a litter box forming a four sided standup bag having upstanding walls defined by portions of the gussets joined to said face panels along the first segments, a rectangular prismatic upper portion, and a trapezoidal pyramidal bottom portion defined by portions of the gussets joined to the face panels along the second segments;
   c) the liner as unfolded having a maximum footprint defined by an open top perimeter edge comprising the upstanding first and second face panels and adjoining gussets;
   d) wherein the bottom portion lacks any fold overs when the liner is unfolded for use with a litter box having a foot print smaller than the maximum footprint.

2. The litter box liner of claim 1, further comprising at least two handle ties integrally formed with the litter box liner.

3. The litter box liner of claim 1, wherein the liner is formed of high density polyethylene.

4. The litter box liner of claim 3, wherein the high density polyethylene is from about 2 to about 3 mils thick.

* * * * *